(12) United States Patent
Hadden

(10) Patent No.: US 10,724,577 B2
(45) Date of Patent: Jul. 28, 2020

(54) SPLIT BEARING CARTRIDGE ASSEMBLY AND SPLIT HOUSED BEARING ASSEMBLY

(71) Applicant: Craft Bearing Company, Newport News, VA (US)

(72) Inventor: Ian G. Hadden, Newport News, VA (US)

(*) Notice: Subject to any disclaimer, the term of this patent is extended or adjusted under 35 U.S.C. 154(b) by 0 days.

(21) Appl. No.: 15/286,045

(22) Filed: Oct. 5, 2016

(65) Prior Publication Data

US 2017/0097046 A1 Apr. 6, 2017

Related U.S. Application Data

(60) Provisional application No. 62/237,207, filed on Oct. 5, 2015.

(51) Int. Cl.

| F16C 33/60 | (2006.01) |
|---|---|
| F16C 35/04 | (2006.01) |
| F16C 43/04 | (2006.01) |
| F16C 33/78 | (2006.01) |
| F16C 19/26 | (2006.01) |
| F16C 33/80 | (2006.01) |
| F16C 23/08 | (2006.01) |
| F16C 33/58 | (2006.01) |
| F16C 33/46 | (2006.01) |

(52) U.S. Cl.
CPC .............. *F16C 33/60* (2013.01); *F16C 19/26* (2013.01); *F16C 23/084* (2013.01); *F16C 33/4694* (2013.01); *F16C 33/586* (2013.01); *F16C 33/7826* (2013.01); *F16C 33/7846* (2013.01); *F16C 33/80* (2013.01); *F16C 35/045* (2013.01); *F16C 35/047* (2013.01); *F16C 43/04* (2013.01); *F16C 43/045* (2013.01)

(58) Field of Classification Search
CPC .. F16C 23/084; F16C 33/4694; F16C 33/586; F16C 33/60; F16C 33/7826; F16C 33/7846; F16C 33/80; F16C 43/04; F16C 43/045

See application file for complete search history.

(56) References Cited

U.S. PATENT DOCUMENTS

| 1,973,994 | A | | 9/1934 | Peterson | |
|---|---|---|---|---|---|
| 2,439,269 | A | | 4/1948 | Shafer | |
| 2,708,125 | A | | 5/1955 | Bryant et al. | |
| 2,983,529 | A | * | 5/1961 | Price | F16C 23/084 277/346 |
| 3,446,542 | A | * | 5/1969 | Whitehurst | F16C 23/084 384/477 |
| 3,773,397 | A | | 11/1973 | Struttmann | |

(Continued)

*Primary Examiner* — James Pilkington
(74) *Attorney, Agent, or Firm* — Servilla Whitney LLC

(57) ABSTRACT

A novel split bearing cartridge assembly is provided having an inner race, clamp collars for securing the inner race to a shaft, a plurality of rolling elements within a cage, an outer race, a bearing container for encapsulating those components, and seals that sit within the openings in the bearing container. All of the above components are split such that the bearing cartridge may be assembled and disassembled on and from a shaft with relative ease. The split inner race extends axially such that the seals act between the openings in the bearing container and the extended portions of the inner race. A split housed bearing assembly that incorporates the novel split bearing cartridge assembly is also provided.

17 Claims, 10 Drawing Sheets

(56) References Cited

U.S. PATENT DOCUMENTS

| | | | |
|---|---|---|---|
| 3,891,286 A | | 6/1975 | Zimmer et al. |
| 3,918,776 A | | 11/1975 | Zimmer et al. |
| 3,957,319 A | | 5/1976 | Gorski |
| 3,989,323 A | * | 11/1976 | Lambert ................ F16C 33/60 384/434 |
| 4,030,785 A | * | 6/1977 | Robinson ............. F16C 19/385 384/474 |
| 4,575,265 A | | 3/1986 | Tooley |
| 4,763,904 A | | 8/1988 | Martinie |
| 4,776,709 A | | 10/1988 | Tooley |
| 4,881,829 A | * | 11/1989 | Koelsch ................ F16C 33/76 277/317 |
| 4,906,111 A | | 3/1990 | Martinie |
| 5,011,301 A | | 4/1991 | Martinie |
| 5,259,628 A | * | 11/1993 | Nisley .................... F16C 33/76 277/348 |
| 5,582,482 A | | 12/1996 | Thom, Jr. et al. |
| 5,630,669 A | * | 5/1997 | Stewart .................. F16C 19/26 384/570 |
| 5,743,659 A | | 4/1998 | Stewart |
| 5,833,372 A | | 11/1998 | Nisley |
| 5,904,356 A | | 5/1999 | Mundy |
| 5,908,248 A | | 6/1999 | Nisley |
| 8,075,196 B2 | | 12/2011 | Burner et al. |
| 9,217,469 B2 | * | 12/2015 | Webster .................. B23H 9/00 |

\* cited by examiner

SPLIT BEARING CARTRIDGE ASSEMBLY AND SPLIT HOUSED BEARING ASSEMBLY

CROSS-REFERENCE TO RELATED APPLICATIONS

This application claims priority to U.S. Provisional Application No. 62/237,207, filed Oct. 5, 2015, the entire disclosure of which is hereby incorporated by reference herein.

FIELD

The present disclosure relates to split bearings, split bearing cartridge assemblies, and split housed bearing assemblies.

BACKGROUND

Split bearings and split bearing assemblies are generally known in the art. They are often selected for use due to the relative ease with which they may be replaced on a shaft. However, certain deficiencies remain with the split bearing assemblies currently in the field that can lead to costly repairs and downtime. An object of the present disclosure is to address the deficiencies of existing split bearing assemblies.

SUMMARY

In one embodiment of the present disclosure, there is provided a split bearing cartridge assembly for mounting on a shaft. The split bearing cartridge assembly may comprise a split inner race fixedly securable to the shaft and providing a first rolling element engaging surface; a plurality of rolling elements retained within a cage, wherein the cage is securable to allow rolling of the rolling elements around the first rolling element engaging surface; and, a split outer race rotatably securable to the rolling elements, wherein the split outer race provides a second rolling element engaging surface for the rolling elements. A split bearing container is also provided for substantially encapsulating the split inner race, split outer race, rolling elements and cage. In this aspect, sealing means are also provided for sealing between the split inner race and openings of the bearing container located axially outwardly from the rolling elements.

In another embodiment of the disclosure, a split housed bearing assembly for supporting a shaft is provided. The split housed bearing assembly comprises a split inner race fixedly securable to the shaft; a plurality of rolling elements retained within a cage; a split outer race rotatably securable to the rolling elements; a split bearing container for substantially encapsulating the split inner race, split outer race, rolling elements and cage; and a split housing for housing the split bearing container. First and second sealing means are provided for sealing between the split inner race and first and second openings, respectively, of the bearing container.

The rolling elements of the split bearing cartridge assembly may be rollers, and more specifically, cylindrical rollers. The seals of the assembly may be rotary seals and of a triple labyrinth construction. The split inner race of the cartridge assembly may extend axially beyond the first and second openings of the split bearing container. The split housing may be, a split pillow block housing, a split flange housing In another aspect of the present disclosure, a split housing may be provided for housing the aforementioned split bearing cartridge assembly.

BRIEF DESCRIPTION OF THE DRAWINGS

For illustration purposes, the following figures have been included to help the reader better understand the preferred embodiments of the disclosure.

DETAILED DESCRIPTION

Preferred embodiments of the present disclosure will now be described in more detail with reference to the aforementioned figures. It is noted that the majority of the elements of the split bearing cartridge assembly and split housed bearing assembly are split elements, that is to say that they are formed in two parts to be joined to form a single working element when installed. In the figures, each of the parts of a split element have been identified with numerals including a lettered suffix, whereas there are no numerals to identify the element as a whole. For example, in FIG. 1, each part of the split inner race 120*a*, 120*b* are identified whereas there is no numeral to identify the inner race as a whole. Throughout this disclosure, whole elements may be described with reference to the appropriate numeral without the lettered suffix (e.g. 120 for the split inner race as a whole) and it should be understood that such a reference is a reference to the ensemble of the corresponding suffixed numerals (e.g. 120*a* and 120*b* for the separate components of the split inner race).

Figure 1:
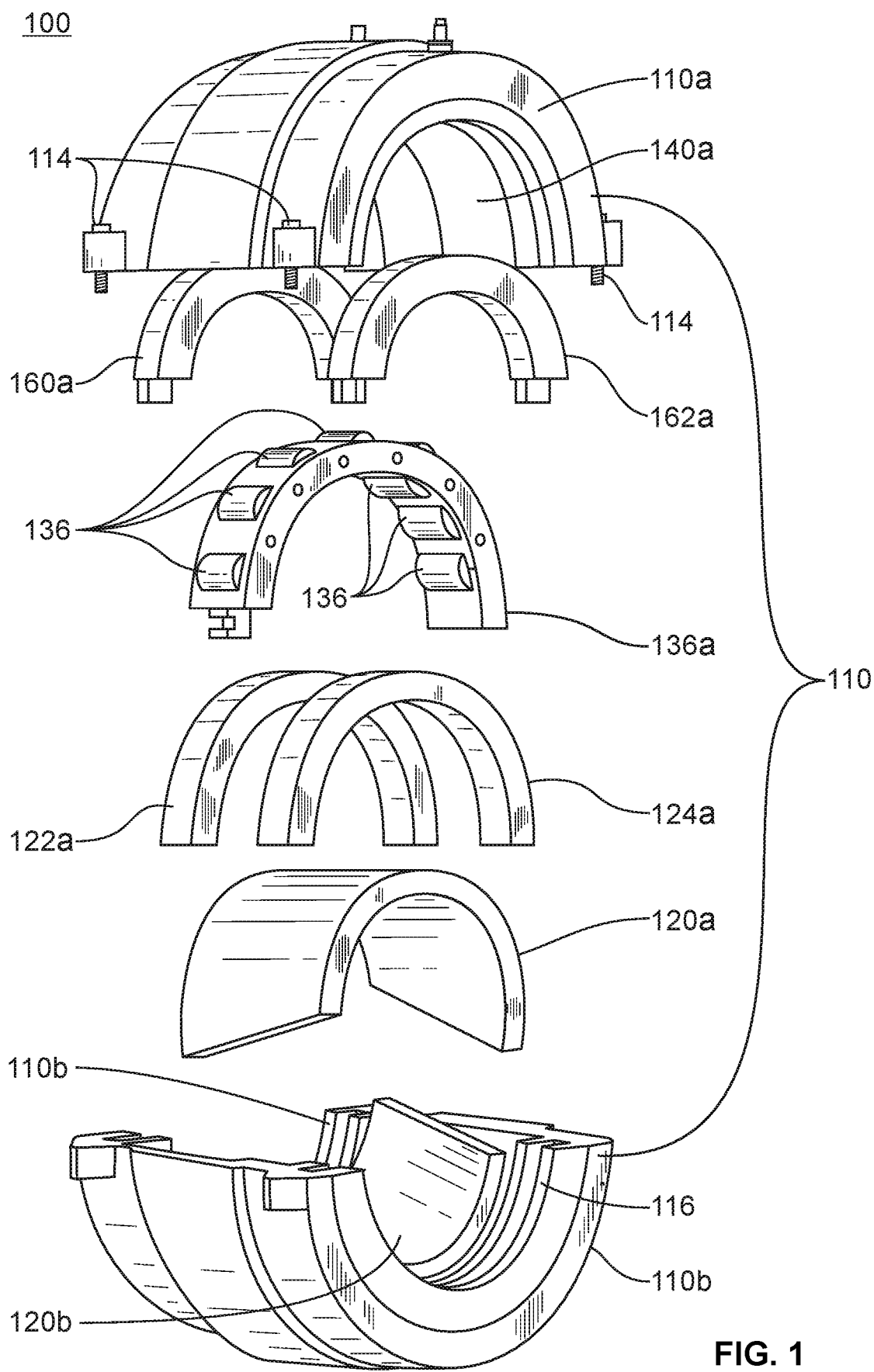
FIG. 1, which is an exploded perspective view of a split bearing cartridge assembly in accordance with the present disclosure.

FIG. 1 shows, in exploded view, a split bearing cartridge assembly 100 in accordance with a preferred embodiment of the present disclosure. A split bearing container 110, made up of two parts 110*a*, 110*b*, is provided as an enclosure for the other elements of the split bearing cartridge assembly 100. The two parts of the split bearing container 110*a*, 110*b* can be secured to one another using fastening means such as bolts 114 located on the exterior of the split bearing container. The skilled person would appreciate that other suitable fastening means may be used to allow selective assembly and disassembly of the split bearing container 110.

The split bearing container 110, when assembled, substantially encapsulates the other split bearing elements of the assembly, which include a split inner race 120, a split cage 130 (the bottom half of the split cage is not shown in FIG. 2), a plurality of rolling elements 136, and a split outer race 140.

Figure 2:
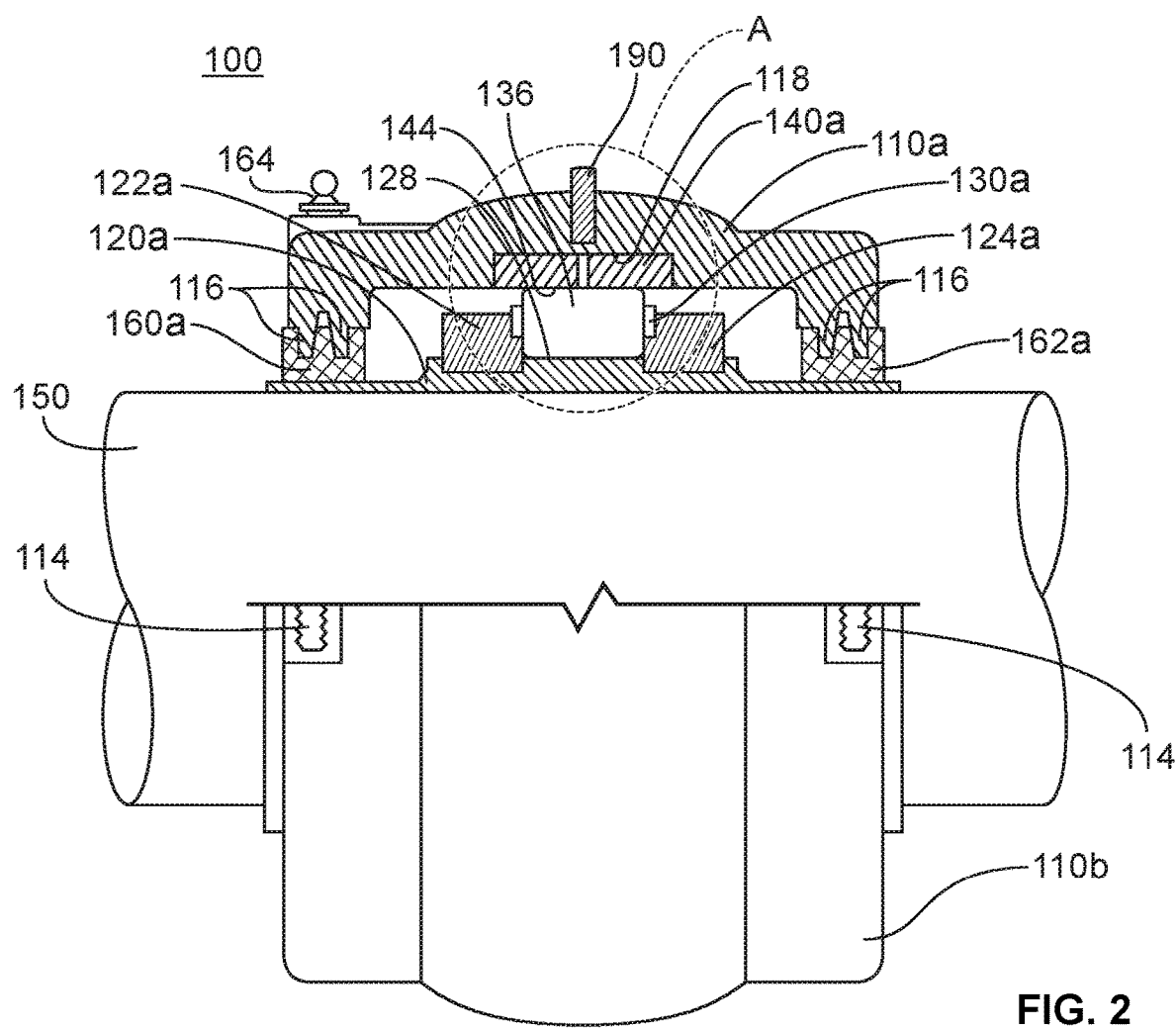
FIG. 2, which is a perspective view, in partial section, of a split bearing cartridge assembly in accordance with the present disclosure.
Figure 4:
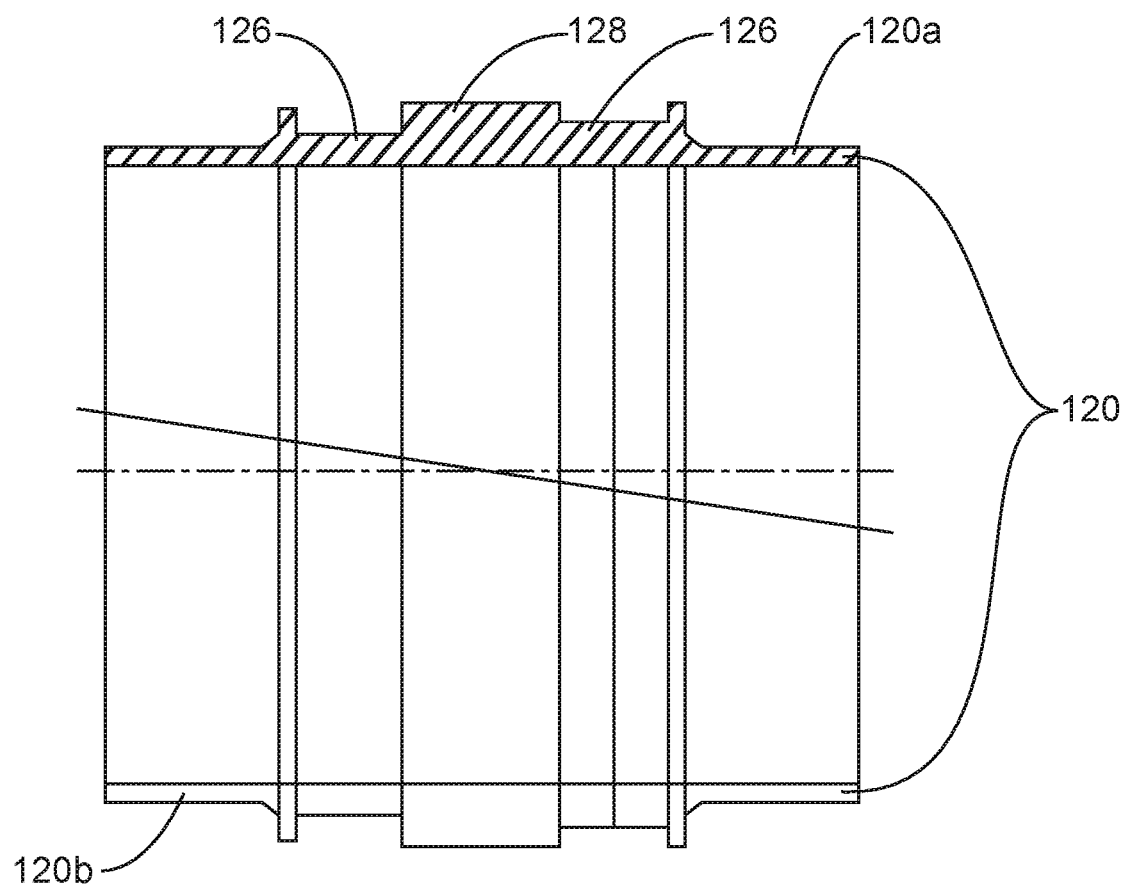
FIG. 4, which is a perspective view, in partial section, of a split inner race in accordance with the present disclosure.
Figure 5:
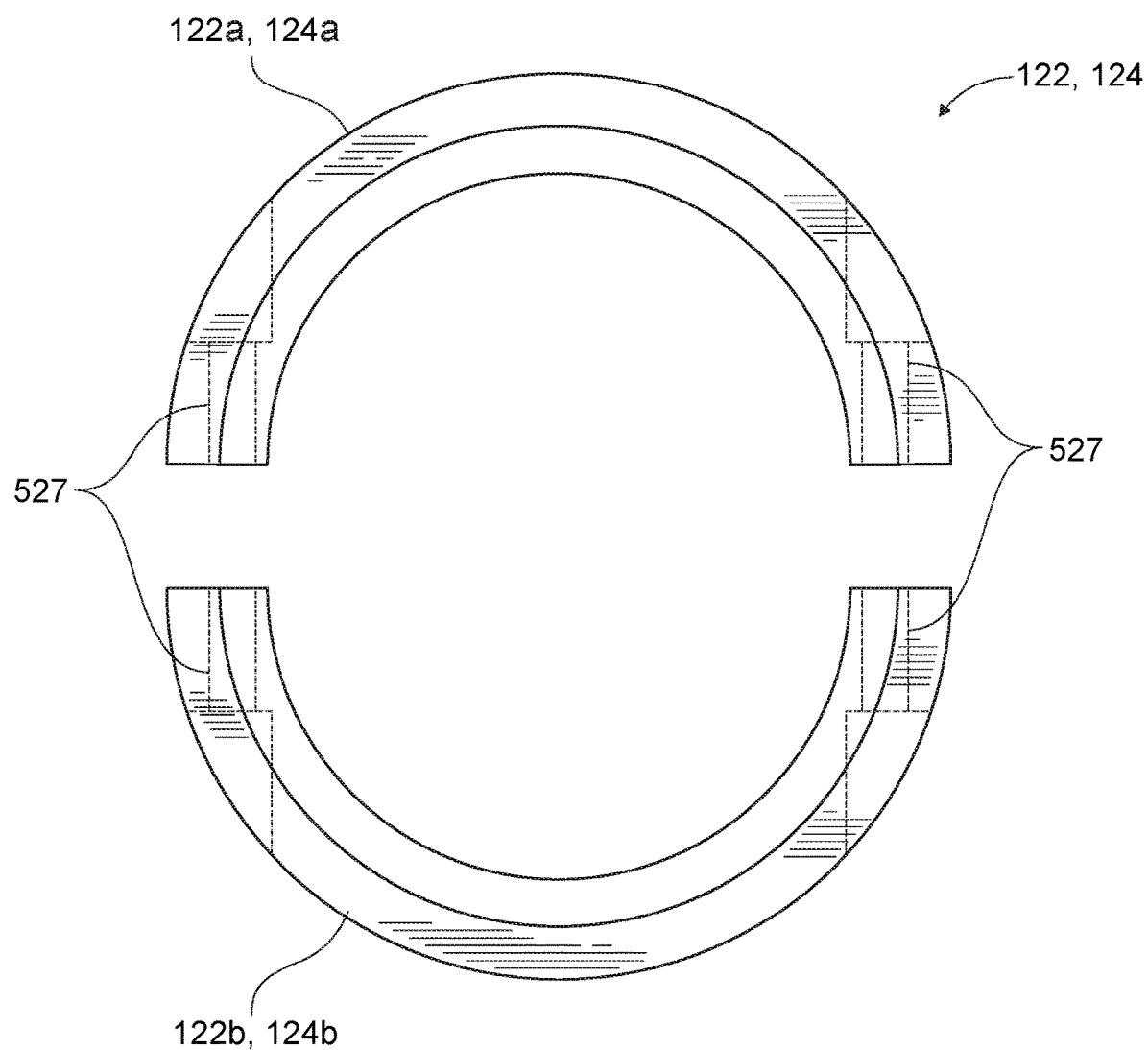
FIG. 5, which is a perspective view of a split inner race clamp ring in accordance with the present disclosure.

With reference to FIGS. 2 and 4, a split inner race 120 may be affixed to a shaft 150 so that the split inner race 120 and the shaft 150 rotate together. In the illustrated embodiment, the split inner race 120 is affixed to the shaft 150 through the use of split clamp rings 122, 124. The two components of the split clamp rings 122*a*, 124*a* may be fixed to their respective counterparts 122*b*, 124*b* (FIG. 5) using capscrews (hidden lines 527 in FIG. 5 show the path of the capscrews) or other fastening means of the like that allow for selective assembly and disassembly of the split clamps rings 122, 124. The split inner race 120 is formed with recesses 126 for accommodating the split clamp rings 122, 124. The recesses 126 are appropriately positioned within the split inner race 120 so that, when assembled, the split clamp rings 122, 124 also serve to substantially prevent axial movement of the split cage 130 and rolling elements 136 (FIGS. 6 and 7) with respect to the split inner race 120.

Figure 6:
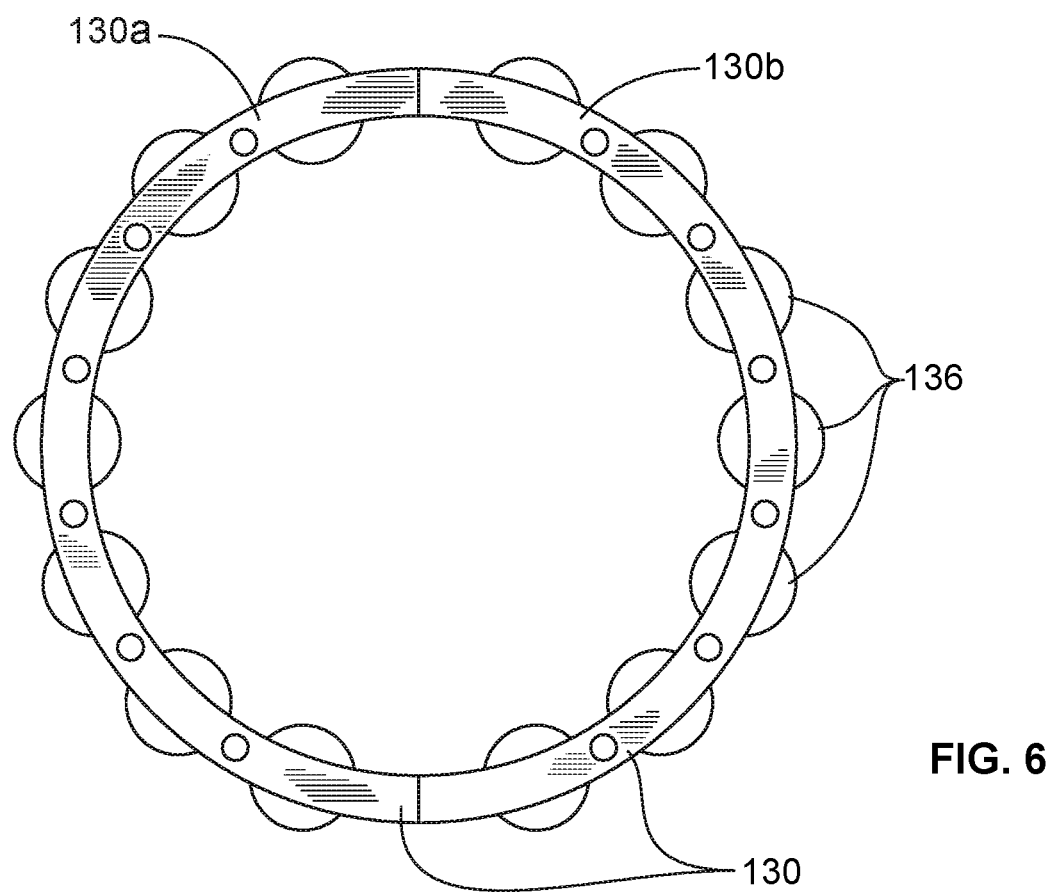
FIG. 6, which is a perspective view of an assembled cage and rolling element assembly in accordance with the present invention.
Figure 7:
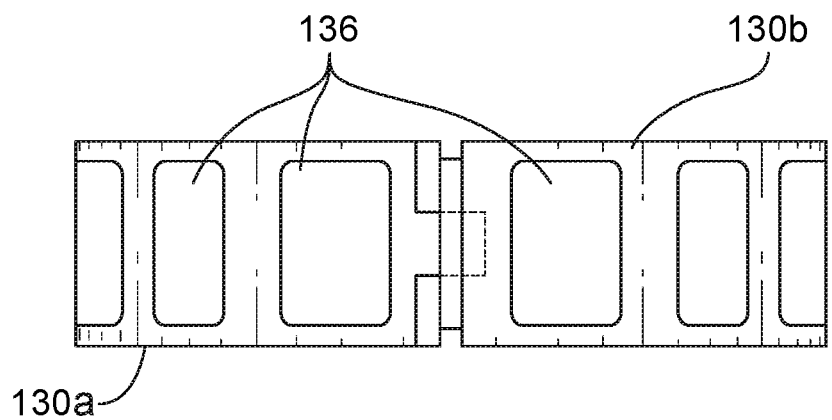
FIG. 7, which is a top view of the assembled cage and rolling element assembly of FIG. 6.

With reference to FIGS. 2, 6 and 7, the split cage 130 and rolling elements 136 may be manufactured and assembled in accordance with methodology known in the art, such as described in U.S. Pat. No. 5,743,659 to the Applicant, which is hereby incorporated by reference. Once the split clamp rings 122, 124 have been installed, thus securing the split inner race 120 to the shaft 150, the split cage 130 (including the rolling elements 136) may be assembled such that the rolling elements 136 engage with the central landing portion 128 of the split inner race 120. The central landing portion 128 of the split inner race 120 provides one of the surfaces with which the rolling elements 136 engage when in operation.

Figure 8:
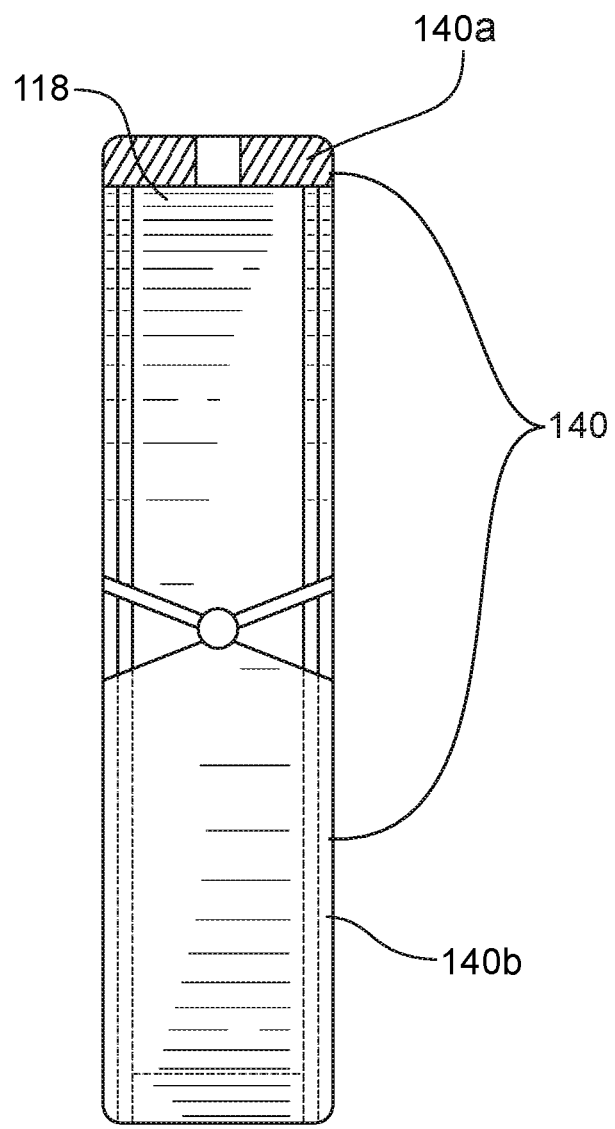
FIG. 8, which is a perspective view, in partial section, of a split outer race in accordance with the present disclosure.

With reference to FIGS. 2 and 8, a split outer race 140 may be positioned around the rolling elements 136 within the split bearing cartridge assembly 100. A portion of the inside surface 144 of the split outer race 140 provides the second surface with which the rolling elements 136 engage when in operation. Accordingly, when in operation, the rolling elements 136 will roll between the central landing portion 128 of the split inner race 120 and a portion of the inside surface 144 of the split outer race 140. The split bearing container 110 is provided with a channel 118 for accommodating the split outer race 140. When assembled, the split outer race 140 sits in the channel 118 thus preventing axial movement of the split outer race 140 within the split bearing container 110.

Figure 3:
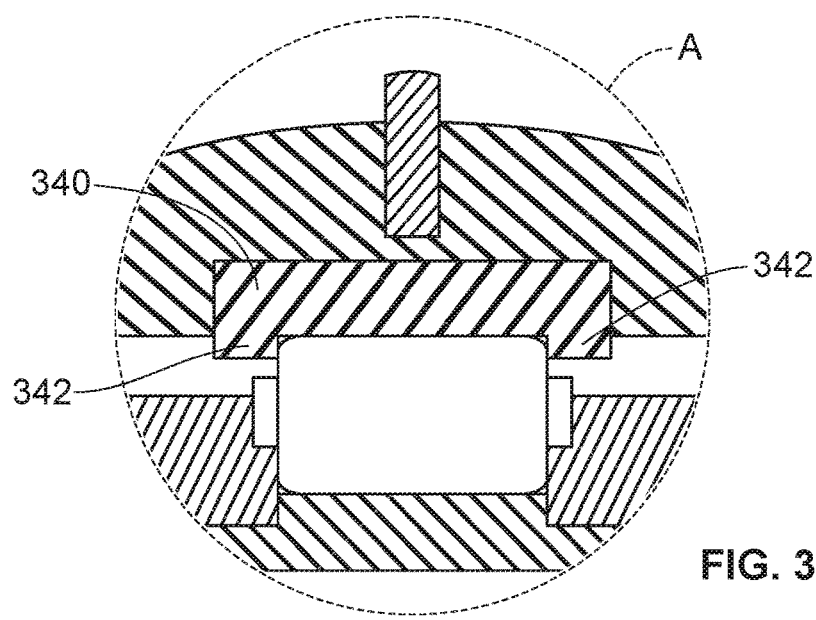
FIG. 3, which is an enlarged view of detail A of FIG. 2, with a variant split outer race.

The split outer race 140 shown in FIG. 2 may be substituted for the split outer race 340 shown in FIG. 3. Whereas the geometry of the split outer race 140 in FIG. 2 allows the shaft 150, split inner race 120 and split cage 130 and rolling elements 136 to float, use of the split outer race 340 shown in FIG. 3 will produce a fixed or held bearing. The bearing is considered to be fixed or held because the tabs 342 provided on the outer race 340 serve to restrict the axial movement of the rolling elements 136, split cage 130, split inner race 110 and clamp rings 122, 124. Typically, where thermal expansion of the shaft 150 in expected, it is desirable for the shaft to be supported by a floating bearing at one end and a fixed bearing at the other end.

With continued reference to FIG. 2, split seals 160*a*, 162*a* serve to help contain lubricant within the split bearing container 110 as well as prevent foreign contaminants from entering the split bearing container 110 and ultimately reaching and damaging the split cage 130 and rolling elements 136. Lubricant may be introduced into the split bearing cartridge assembly 100 via lubrication fitting 164. The lubricant may be a lithium-based grease or any other suitable lubricant known to those skilled in the art. The split seals 160*a*, 162*a* are rotary seals (e.g. triple labyrinth seals made predominantly of aluminum), and act to substantially seal the openings of the split bearing container 110 on either side of the rolling elements 136. The split bearing container 110 may be provided with fingers 116 at each of its openings for engaging with the split seals 160*a*, 162*a* to help maintain a seal where the split seals 160*a*, 162*a* meet the split bearing container 110. As best illustrated in FIG. 2, the split inner race 120 extends axially such that the split seals 160*a*, 162*a* ride on an outer surface of the split inner race 120.

As is generally known in the art, over time, the seals of a housed bearing unit may wear grooves into the shaft upon which they are installed. When installing a replacement split bearing cartridge assembly or split housed bearing assembly (as will be described in more detail below) on a shaft that has sustained damage at the areas of seal contact, the effectiveness of the seals of the replacement unit may be compromised due to poor contact between the new seals and the damaged surface of the shaft. This, in turn, may lead to an increased risk of premature failure of the replacement bearing unit. Conversely, when replacing a failed housed bearing unit with a split bearing cartridge assembly or split housed bearing assembly according to the present disclosure, the split inner race 110 extends far enough axially to seal against undamaged portions of the shaft when the split inner race 110 is tightly clamped over the shaft. The outer surface of the extended portions of the split inner race 110 provide a clean smooth surface for the split seals 160*a*, 162*a* to ride on, thereby greatly reducing, if not eliminating, the risk of premature failure associated with sealing on a damaged shaft. Furthermore, subsequent damage caused by the split seals 160*a*, 162*a* in the split bearing cartridge assembly of the present disclosure will be sustained by the split inner race 110, which is inexpensive to replace as compared to the shaft.

Figure 9:
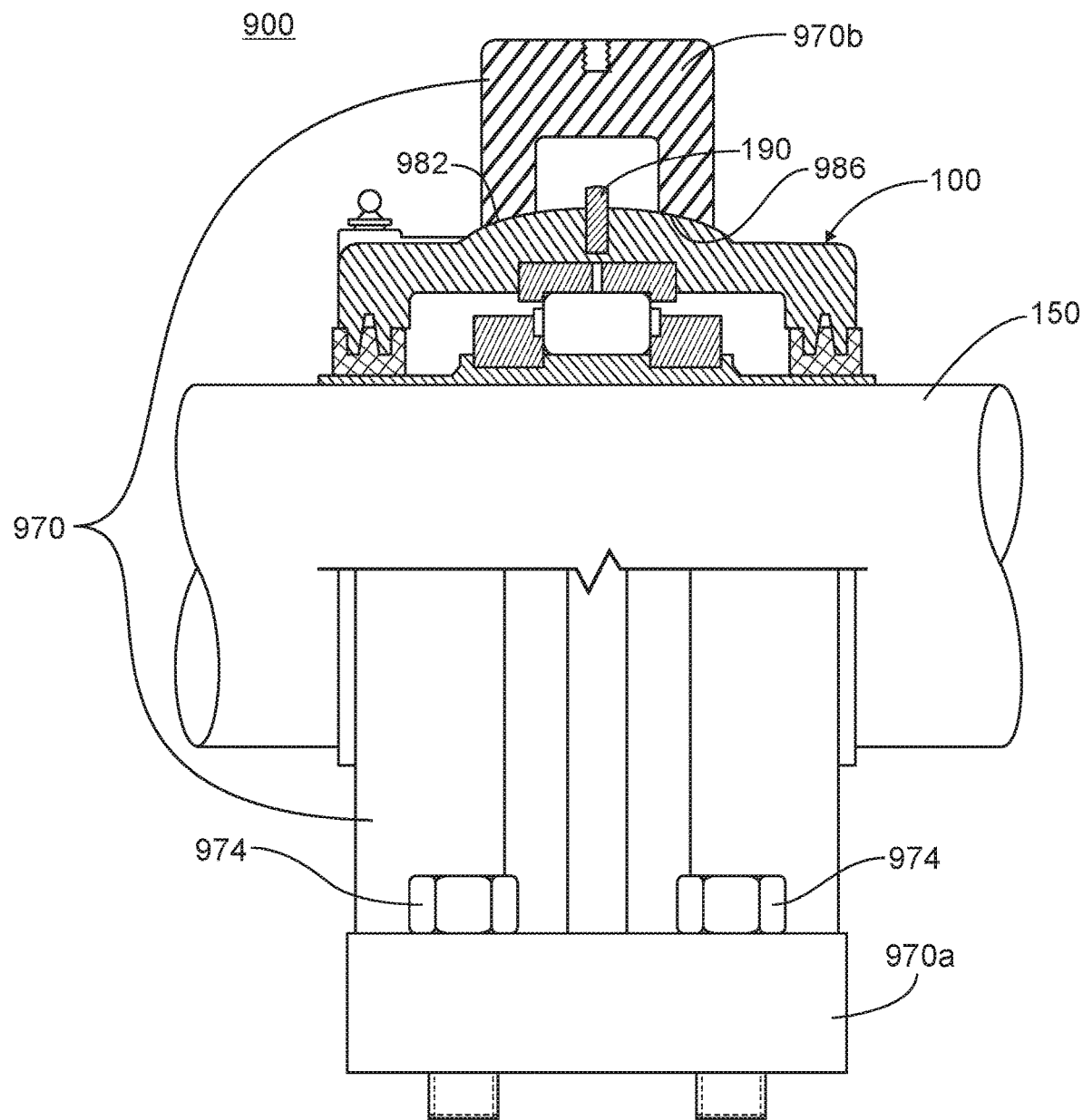
FIG. 9, which is a perspective view, in partial section, of a split housed bearing assembly in accordance with the present disclosure.
Figure 10:
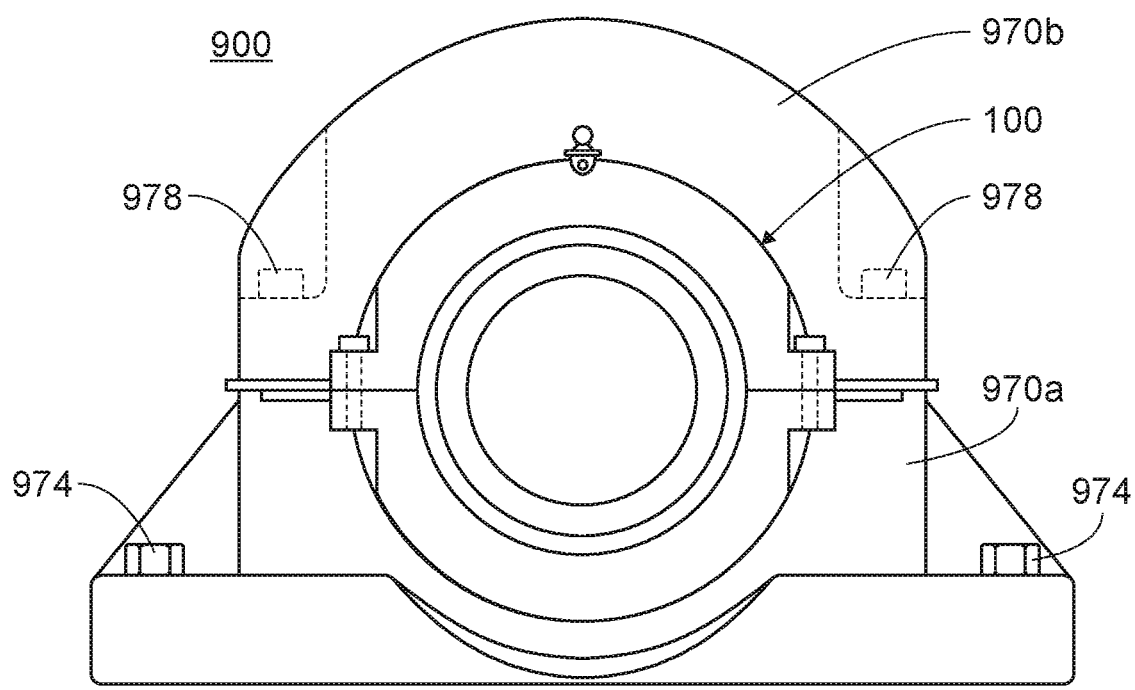
FIG. 10, which is an alternate perspective view of the split housed bearing assembly of FIG. 9.

A split housed bearing assembly 900 in accordance with the present disclosure will now be described with reference to FIGS. 9 and 10. In FIG. 9, the split bearing cartridge assembly 100 of FIGS. 1 and 2 is supported by a split housing 970. The split housing selected to illustrate the embodiment shown in FIGS. 9 and 10 is commonly referred to as a split pillow block housing and includes a base portion 970*a* and a mating portion 970*b*. The base portion 970*a* may be secured to stable surface, for example a structurally secure steel beam, through the use of bolts 974. With the base portion 970*a* secured, the shaft 150, which may be raised and suspended above its eventual resting position to facilitate assembly of the split bearing cartridge assembly 100, may be lowered into its desired position with the split bearing cartridge assembly seated in the base portion 970*a* of the housing. The mating portion 970*b* may then be positioned atop the base portion 970*a* and secured to the base portion 970*a* using capscrews 978 or other suitable fastening means known to those skilled in the art.

The outer surface 982 of the central portion of the split bearing cartridge assembly may be arcuate to mate with a similarly arcuate inside surface 986 of the base portion 970*a* and mating portion 970*b* of the split pillow block housing. The corresponding arcuate mating surfaces 982, 986 permit some misalignment of the split bearing cartridge assembly 100 within the split housing 970. A pin 190 may be inserted into the outside of the split bearing container 110 to restrict the degree to which the cartridge 100 may misalign within the split housing 970.

Figure 11:
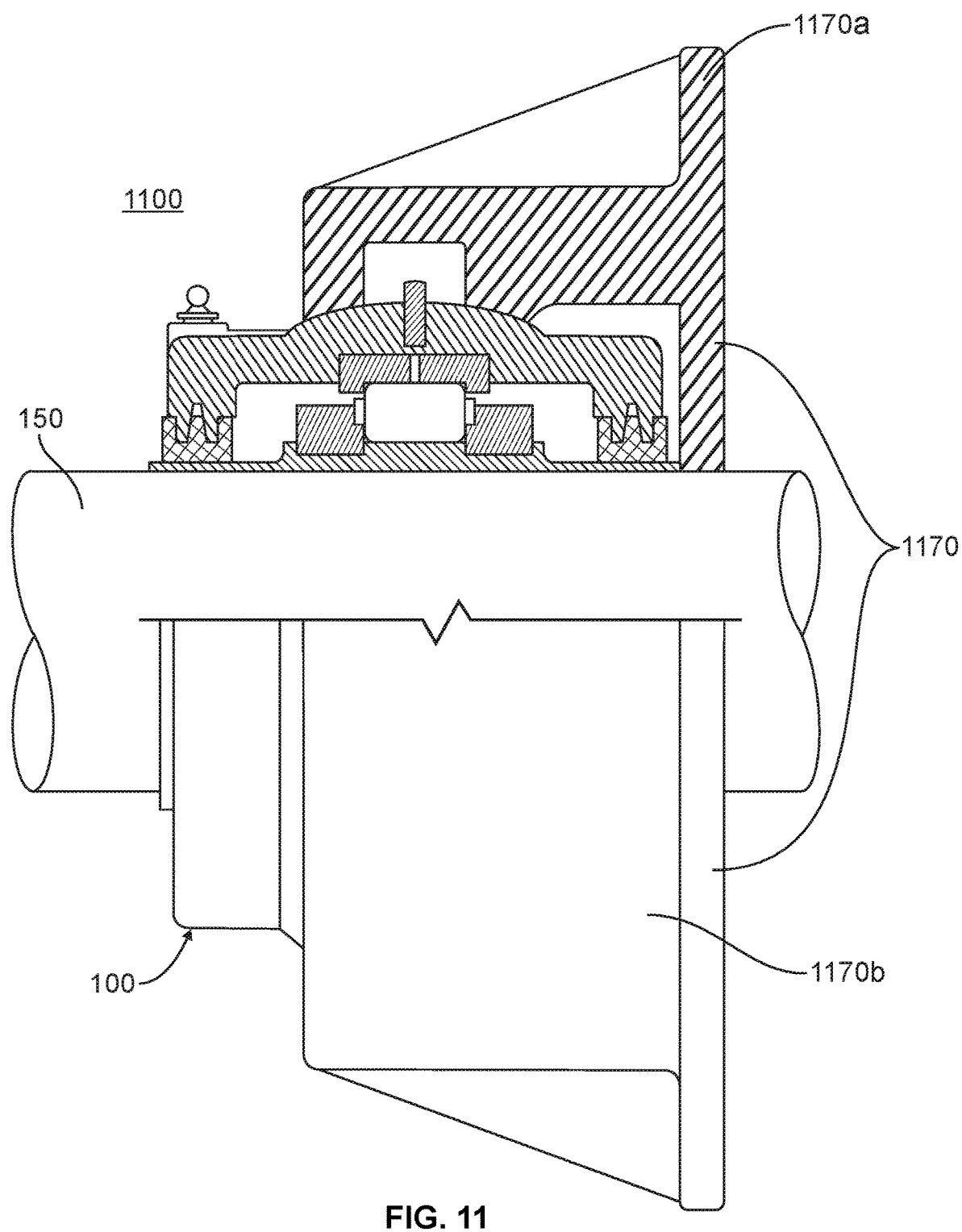
FIG. 11, which is a perspective view, in partial section, of another split housed bearing assembly in accordance with the present disclosure.
Figure 12:
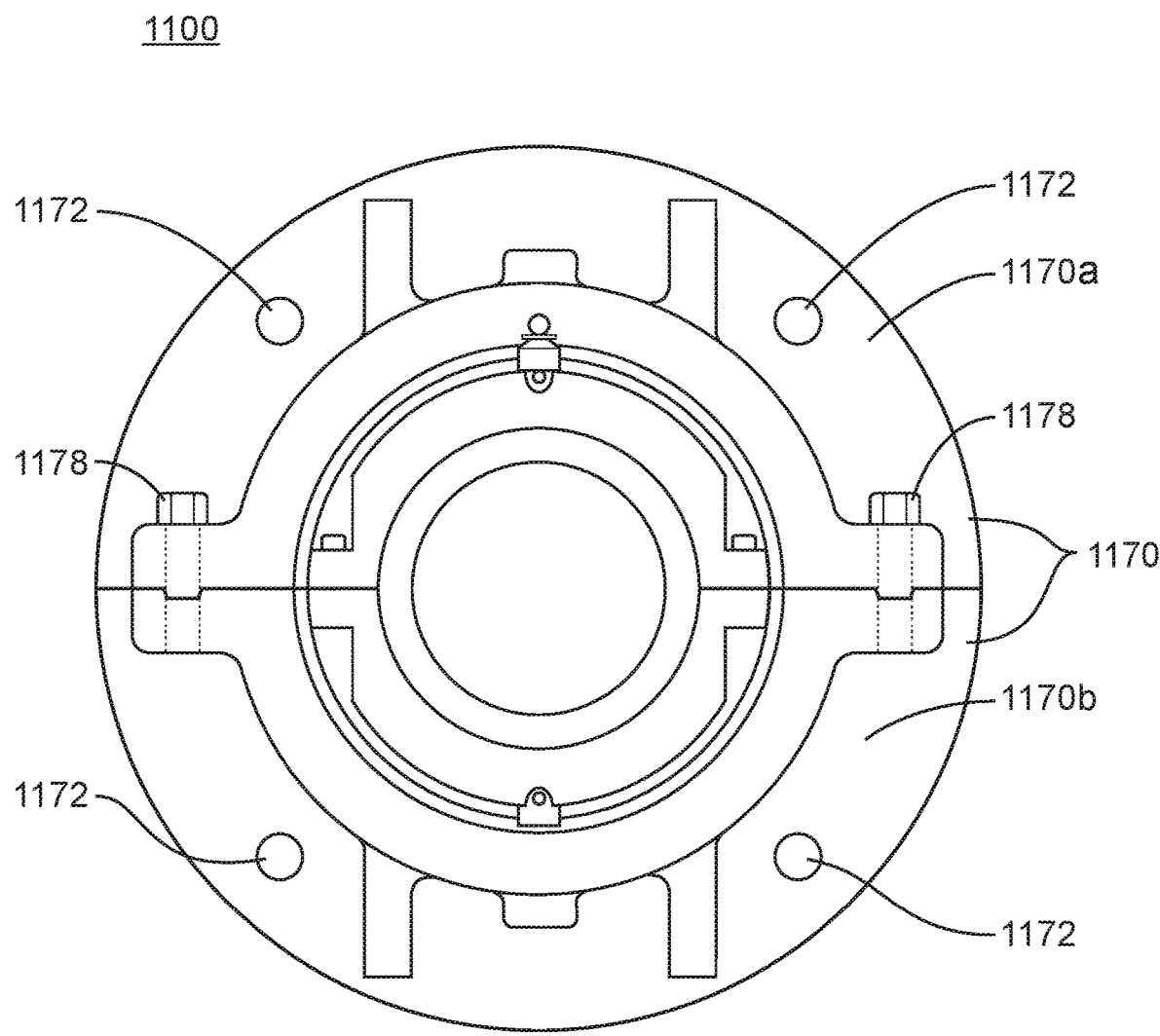
FIG. 12, which is an alternate perspective view of the split housed bearing assembly of FIG. 11.

A split pillow block housing, such as the one shown in FIGS. 9 and 10 is commonly used where the plane of the stable surface to which the housed unit is to be secured is parallel to the axis of the shaft. Another embodiment of the present disclosure involves a split flanged housing 1170 and will now be described with reference to FIGS. 11 and 12. This type of flange housing may be used where the plane of the stable surface to which the housed unit will be secured and the axis of the shaft are orthogonal.

Split housed bearing assembly 1100 comprises the split bearing cartridge assembly 100 of FIGS. 1 and 2 supported by a split flanged housing 1170. The split flanged housing 1170 may be made up of a first portion 1170a and a mating portion 1170b that come together and support the split bearing cartridge assembly 100 in a similar fashion to the embodiment illustrated in FIGS. 9 and 10. The first and mating portions 1170a, 1170b may be secured together using capscrews 1178 or other suitable fastening means known in the art. In order to provide support for the shaft upon which the housed bearing assembly 1100 will be installed, the split flange 1170 may be secured to a stable surface by the use of bolts (not shown) through bolt holes 1172 provided in the split flange 1170. Although there are four bolt holes 1172 in the embodiment illustrated in FIG. 12, any suitable number of bolt holes may be used provided the split housed bearing assembly can support the shaft once secured to the stable surface.

The present disclosure does not require any specific boundary dimensions for the split bearing cartridge assembly and split housed bearing assembly; however, selecting the boundary dimensions to correspond with existing housed bearing units being used in the field may be desirable in order to facilitate interchangeability.

Although the preceding description relates to particular preferred embodiments of the disclosure only, the skilled reader will appreciate that modifications are possible within the scope of the appended claims.

The invention claimed is:

1. A split bearing cartridge assembly for mounting on a shaft, the split bearing cartridge assembly comprising:
   a split inner race fixedly securable to the shaft, the split inner race providing a first rolling element engaging surface;
   a plurality of rolling elements retained within a cage, said cage securable to allow rolling of the rolling elements around the first rolling element engaging surface;
   a split outer race rotatably securable to the rolling elements, the split outer race providing a second rolling element engaging surface for the rolling elements;
   a split bearing container for substantially encapsulating the split inner race, split outer race, rolling elements and cage;
   a first split seal in direct contact with the split inner race and the split bearing container, the first split seal configured to provide a seal between the split inner race and a first opening of the bearing container; and
   a second split seal in direct contact with the split inner race and the split bearing container, the second split seal configured to provide a seal between the split inner race and a second opening of the bearing container,
   wherein the split inner race comprises a first recess and a second recess, the first and second recesses arranged on opposite sides of the first rolling element engaging surface;
   and wherein the first and second recesses are configured to accommodate split clamp rings for securing the split inner race to the shaft and for substantially preventing axial movement of the cage and rolling elements;
   and wherein the split inner race further comprises a first seal riding portion extending axially from the first recess toward the first opening of the bearing container, and a second seal riding portion extending axially from the second recess toward the second opening of the bearing container;
   and wherein the first and second split seals seal between the first and second seal riding portions of the split inner race and the split bearing container at the first and second openings, respectively.

2. The split bearing cartridge assembly of claim 1, wherein the cage is of a split configuration and comprises at least two cage components.

3. The split bearing cartridge assembly of claim 2, wherein the rolling elements comprise rollers.

4. The split bearing cartridge assembly of claim 3, wherein the rollers comprise cylindrical rollers.

5. The split bearing cartridge assembly of claim 1, wherein the first and second split seals comprise rotary seals.

6. The split bearing cartridge assembly of claim 5, wherein the rotary seals are triple labyrinth seals.

7. The split bearing cartridge assembly of claim 1, wherein the split inner race extends axially beyond the first and second openings of the split bearing container.

8. The split bearing cartridge assembly of claim 1, wherein the split bearing container comprised fingers at each of its openings and wherein the first and second split seals engage with the first and second seal riding portions of the split inner race and the fingers of the split bearing container at each of its openings.

9. A split housed bearing assembly for supporting a shaft, the split housed bearing assembly comprising:
   a split inner race fixedly securable to the shaft, the split inner race providing a first rolling element engaging surface;
   a plurality of rolling elements retained within a cage, said cage securable to allow rolling of the rolling elements around the first rolling element engaging surface;
   a split outer race rotatably securable to the rolling elements, the split outer race providing a second rolling element engaging surface for the rolling elements;
   a split bearing container for substantially encapsulating the split inner race, split outer race, rolling elements and cage;
   a first split seal in direct contact with the split inner race and the split bearing container, the first split seal forming a seal between the split inner race and a first opening of the bearing container; and
   a second split seal in direct contact with the split inner race and the split bearing container, the second split seal forming a seal between the split inner race and a second opening of the bearing container; and,
   a split housing for housing the split bearing container,
   wherein the split inner race comprises a first recess and a second recess, the first and second recesses arranged on opposite sides of the first rolling element engaging surface;
   and wherein the first and second recesses are configured to accommodate split clamp rings for securing the split inner race to the shaft and for substantially preventing axial movement of the cage and rolling elements;
   and wherein the split inner race further comprises a first seal riding portion extending axially from the first recess toward the first opening of the bearing container, and a second seal riding portion extending axially from the second recess toward the second opening of the bearing container;

and wherein the first and second split seals seal between the first and second seal riding portions of the split inner race and the split bearing container at the first and second openings, respectively.

10. The split housed bearing assembly of claim 9, wherein the cage is of a split configuration and comprises at least two cage components.

11. The split housed bearing assembly of claim 10, wherein the rolling elements comprise rollers.

12. The split housed bearing assembly of claim 11, wherein the rollers comprise cylindrical rollers.

13. The split housed bearing assembly of claim 9, wherein the first and second split seals comprise rotary seals.

14. The split housed bearing assembly of claim 13, wherein the rotary seals are triple labyrinth seals.

15. The split housed bearing assembly of claim 9, wherein the split inner race extends axially beyond the first and second openings of the split bearing container.

16. The split housed bearing assembly of claim 9, wherein the split housing comprises a split pillow block housing.

17. The split housed bearing assembly of claim 9, wherein the split housing comprises a split flange housing.

* * * * *